B. F. GILLIS.
WHEEL FOR TRACTION ENGINES.
APPLICATION FILED DEC. 4, 1913.
1,104,655.
Patented July 21, 1914.
2 SHEETS—SHEET 2.
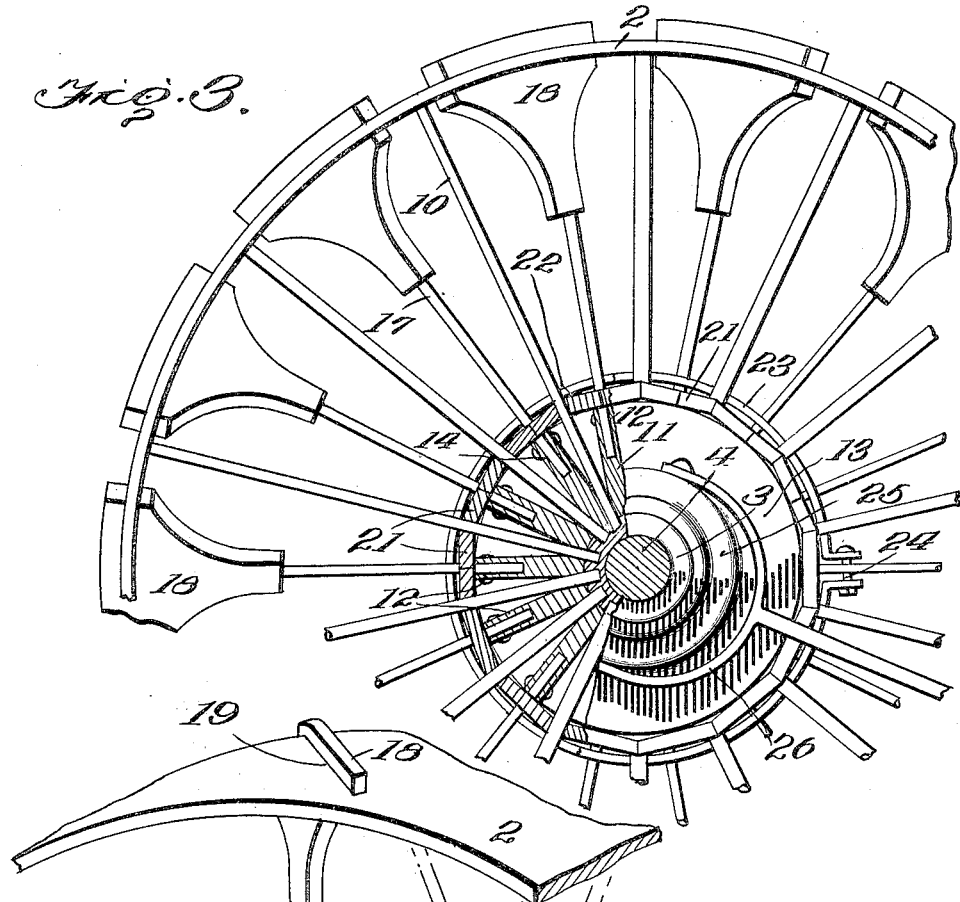
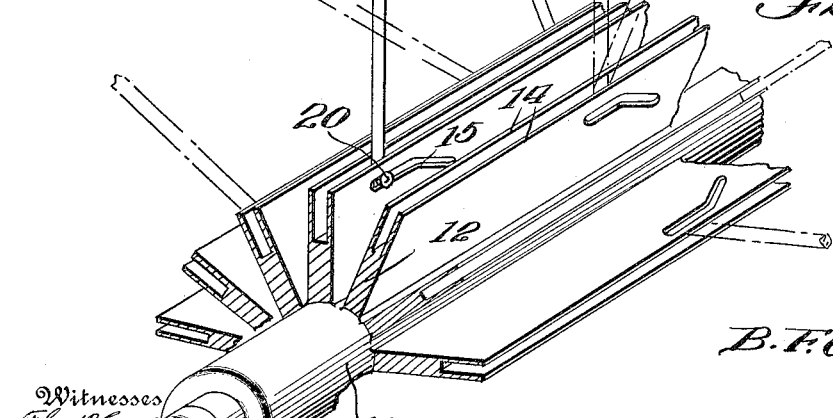

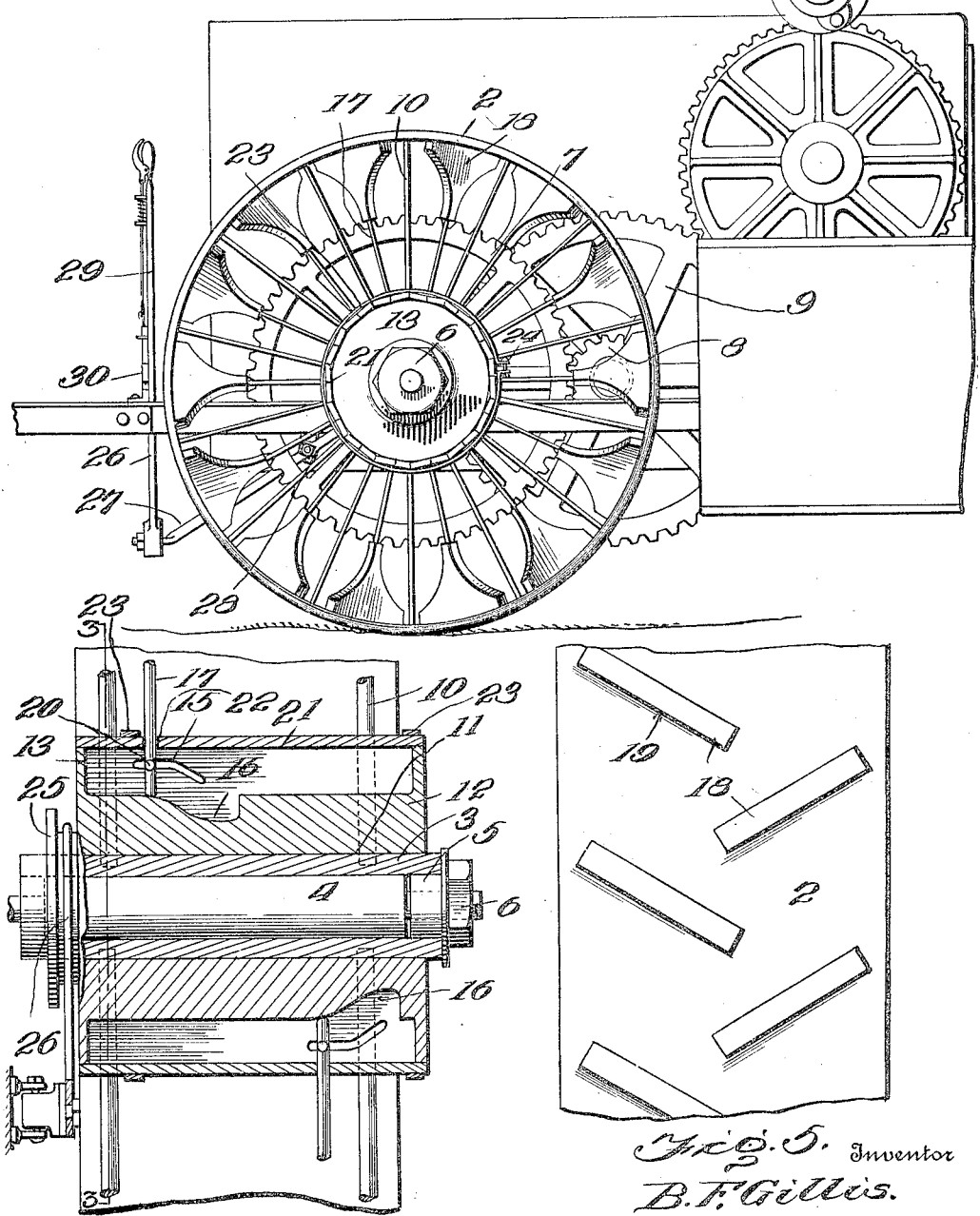

UNITED STATES PATENT OFFICE.

BENJAMIN F. GILLIS, OF WATERTOWN, WISCONSIN.

WHEEL FOR TRACTION-ENGINES.

1,104,655.  Specification of Letters Patent.  Patented July 21, 1914.

Application filed December 4, 1913. Serial No. 804,706.

*To all whom it may concern:*

Be it known that I, BENJAMIN F. GILLIS, a citizen of the United States, residing at Watertown, in the county of Jefferson and State of Wisconsin, have invented certain new and useful Improvements in Wheels for Traction-Engines, of which the following is a specification.

My invention relates to vehicles, such as traction engines, and like structures, and particularly to the traction wheels thereof.

The primary object of my invention is to provide a traction wheel with tractive teeth or mud-lugs, as they are termed, which are shiftable into or out of a projected position, thus permitting the traction wheel to be used under circumstances where a smooth faced traction wheel could not be used.

Another object of the invention is the provision of manually controlled means for shifting the mud-lugs into and out of their projected positions.

A further object of the invention is to provide very simple and easily operated mechanism for projecting or retracting the mud lugs, this mechanism being so formed as to provide for proper guidance and support of the mud-lug rods.

A further object of the invention is the provision of detachable sections or caps, forming a sectional housing extending entirely around the wheel and covering and inclosing the cam plates whereby the lugs are projected or retracted, thus preventing any access of dust and dirt to the lug-actuating mechanism.

A further object of the invention is to so dispose the mud-lugs upon the face of the traction wheel as to secure the maximum tractive effect and so prevent any lateral sliding or skidding action of the traction wheel.

Other objects will appear in the course of the following description.

My invention is illustrated in the accompanying drawings, wherein:—

Figure 1 is a side elevation of a portion of a traction engine showing my improved mechanism applied to the rear traction wheel. Fig. 2 is an enlarged diametrical section through the hub portion of a traction wheel. Fig. 3 is a fragmentary vertical section on the line 3—3 of Fig. 2, the rim of the traction wheel and the mud-lugs being shown in elevation. Fig. 4 is a perspective detail view showing a fragmentary view of the traction wheel rim, one of the mudlugs and its corresponding spokes and the camplates, whereby the mud-lugs are projected or retracted. Fig. 5 is a face view of a portion of the wheel rim to show the disposition of the mud-lugs.

Corresponding and like parts are referred to in the following description and indicated in all the views of the accompanying drawings by the same reference characters.

By referring to these figures, it will be seen that my improved wheel comprises a rim 2 which is relatively broad, as usual, and a hub 3, this hub rotating upon a fixed axle 4 extending out from the body of the engine in the usual manner. The fixed axle is reduced at its extremities, as shown in dotted lines in Fig. 2, and disposed between the extremities of the hub 3 and fixed axle are the washers 5. The hub is held upon the axle by means of the usual nut, or like device 6. The hub carries upon it, preferably attached to the wheel body itself, the usual gear-wheel 7, whereby power may be transmitted to the traction wheel from the pinion 8 mounted in the shaft of the gear-wheel 9, which in turn is operatively connected to the engine in any ordinary or usual manner. The rim 2 of the wheel is connected to the hub 3 by means of radiating spokes 10 of any usual or ordinary mechanism.

Disposed upon the hub 3 and slidably mounted on this hub is a sleeve 11, formed as illustrated in Fig. 4, of a plurality of radiating blades 12, connected at their ends to preferably integral webs 13. The spokes 10 pass inward each between a pair of the blades 12, as shown clearly in Fig. 2, there being space enough at the adjacent bases of the blades to permit the slide to shift relative to the spokes. Each blade 12 is continued laterally outward to form the oppositely disposed spaced walls 14 and these walls 14 of each blade 12 are formed with registering cam slots 15 angular in form, as shown clearly in Figs. 2 and 4, one portion of each slot extending parallel to the circumference of the wheel and the other portion extending inward and laterally. Each blade, immediately beneath the corresponding cam slot 15, as shown clearly in Fig. 2, is recessed as at 16, this recess approximately conforming to the shape of the cam slot, that is, extending inward and laterally.

Disposed between each pair of walls 14 is a lug rod 17. The outer end of this rod is connected to a head 18 which is flat and forms the body of the lug and which is adapted to project through a slot 19 formed in the rim 2 of the wheel, as shown in Figs. 2 and 4. The inner end of each lug rod 17 is provided with a transversely extending pin 20 which operates within the slots 15.

It will now be obvious that by laterally shifting the sleeve 11 in one direction, it will cause a projection of the mud-lugs and laterally shifting the sleeve in the other direction will cause a retraction of these lugs. When the lugs are retracted the outer edge faces of the lugs will be flush with the outer face of the wheel rim, while when the lugs are projected they will take the position shown in Figs. 2 and 4.

For the purpose of guiding and securely supporting the rods 17 of the mud lugs, I provide a sectional housing designated generally 21, which is formed of a series of staves, as they may be termed, or cover sections, which extend parallel to and rest upon the outer edge faces of the walls 14, and which abut against each other, each cover section being cut away or notched at 22 to fit around the rods or spokes 17 and to fit around the spokes 10. Normally the cover sections 21 abut against each rod and are held tightly in contact with the edges of the end walls 13 by means of hoops 23. Each may be adjustably tightened upon the cover sections to clamp them securely in place, in any suitable manner as by means of nuts or bolts 24. When the hoops 23 are loosened and the hoops removed, it is possible to detach the cover sections so as to secure access to the interior mechanism housed thereby. As will be seen from Fig. 2 each of the rods 17 bears at its inner end against the outer face of the sleeve 11 and rides upon the inwardly inclined face of the recess 16 when the sleeve is laterally shifted.

For the purpose of laterally shifting the sleeve, I preferably provide a shipper-ring or grooved member 25 formed integrally with or attached to the inner end of the sleeve or slide 11, and actuated by means of a shipper-lever 26 having an arm 27 pivoted to a bracket 28 on the frame of the machine. This arm 27 at its outer end is operatively connected to an actuating lever 29 moving over a rack 30, or arranged in any suitable manner so that it may be locked in one or another position. By shifting the lever 29 in one direction it will be obvious that the slide or sleeve 3 will be shifted outward and by shifting the lever in the other direction that the slide or sleeve will be shifted inward.

It will be noted from Fig. 5, and also from Fig. 4 that the mud-lugs 18 are disposed not at right angles to the plane of the traction wheel but at less than a right angle thereto. It will also be noted that the lugs are of such length and are at such angles that the rear end of one lug is approximately in alinement with the forward end of the next succeeding lug in the rear of the first-named lug. This disposition of these lugs has an important advantage, in that the lugs not only secure ample forward traction but by reason of their angular seating they resist any tendency of the wheel to slide laterally. Furthermore, as one lug approximately overlaps the next adjacent lugs, there will always be some one lug in engagement with the ground when the lugs are projected. Inasmuch as the lugs are mounted in the rim and the rods of the lugs pass between the cover sections 21 and these bear against the spokes 10, it will be obvious that the mud lugs are thoroughly braced and will not break, and furthermore that the traction of these lugs is applied to the wheel at a plurality of points. The lugs and their rods may be readily removed from the wheel if desired, or readily replaced, and all the parts are also easily accessible, and repairs may be easily and quickly made. The pins 20 are removable, thus permitting detachment of the rods 17 from between the walls 14. It will further be noted that my improved wheel is so constructed that all of the lugs may be projected or retracted simultaneously and to any degree required.

It will of course be understood that preferably the rear wheels of a traction engine are to be provided with these mud-lugs and that a separate actuating mechanism will be provided for each wheel. It is possible to connect the separate actuating mechanisms, however, to another actuating mechanism so that all lugs of all of the wheels may be controlled from one point. The lower end of each lug rod has a solid bearing, or foundation, upon the face of the recess 16 and each rod 17 is laterally braced by the walls 14.

The device is intended for all classes of traction engine or any power-operated vehicles where mud-lugs are needed.

While I have illustrated what I believe to be the best form of my apparatus, I wish it to be understood that many minor changes might be made therein without departing from the spirit of the invention.

Having thus described the invention what is claimed as new is:—

1. In a traction wheel, a hub, a rim, rigid spokes connecting the hub and rim, a plurality of radially extending mud-lugs shiftable through slots formed in the rim, each mud-lug including an inwardly extending rod, a sliding sleeve surrounding the hub and through which the rigid spokes pass, said sleeve including a plurality of radially directed blades, each blade including spaced walls, said spaced walls being formed with angular cam-slots, the inner end of each rod extending into the space between a pair of walls, a pin extending through the cam slots of each pair and through the inner end of the corresponding rod, and manually actuatable means for shifting the sliding sleeve laterally to cause the projection or retraction of said mud-lugs.

2. In a wheel of the character described, a hub, a rim, rigid spokes connecting the hub and rim, a plurality of mud-lugs operating through slots in the rim, and each including an inwardly extending rod, a longitudinally sliding member mounted upon the hub and operatively connected to the rods to cause a projection of the lugs on a movement of the sliding member in one direction, and a retraction of the rods upon a movement of the sliding member in the other direction, a housing inclosing said sliding member and the inner ends of said rods and said housing being formed of removable sections, and means for holding the housing sections in engagement with each other.

3. In a wheel of the character described, a hub, a rim, rigid spokes connecting the hub and rim, a plurality of mud-lugs disposed in slots in said rim and each mud-lug having an inwardly extending rod, a sliding member mounted upon the hub and comprising a plurality of radiating blades and annular end-pieces, each of said blades having a pair of spaced outwardly extending walls, each pair of walls being formed with alining cam-slots, the inner end of each spoke being disposed between the walls of a corresponding blade, a pin extending through the corresponding cam-slots and through each rod, manually actuatable means for laterally shifting the sliding member to cause the projection and retraction of the lugs, and a housing surrounding the sliding member and resting upon the edges of the laterally extending walls thereof, said housing comprising detachable sections.

4. In a wheel of the character described, a hub, a rim, fixed spokes connecting the hub and rim, a plurality of mud-lugs disposed in slots in said rim and having inwardly extending rods, a sliding sleeve mounted upon the hub and comprising annular end-members and longitudinally extending blades spaced from each other to receive the rigid spokes between them, each blade being outwardly extended to form spaced walls, said walls being provided with cam-slots, the inner end of each rod being received between a pair of said walls, the inner extremity of each rod bearing upon the edge face of the blade, said edge-face being recessed to correspond to the form of said cam-slot and thereby provide a bearing for the inner end of the corresponding rod, a pin passing through said cam slots and through each rod, and manually actuatable means for laterally shifting the sleeve to thereby project or retract the mud-lugs.

5. In a wheel of the character described, a hub, a rim, fixed spokes connecting the hub and rim, a plurality of mud-lugs disposed in slots in said rim and having inwardly extending rods, a sliding sleeve mounted upon the hub and comprising annular end-members and longitudinally extending blades spaced from each other to receive the rigid spokes between them, each blade being outwardly extended to form spaced walls, said walls being provided with cam-slots, the inner end of each rod being received between a pair of said walls, the inner extremity of each rod bearing upon the edge face of the blade, said edge face being recessed to correspond to the form of said cam slot and thereby provide a bearing for the inner end of the corresponding rod, a pin passing through said cam slots and through each rod, and a housing formed of a plurality of cover sections resting at their ends upon the annular members at the ends of the sleeve and notched to permit the passage of the rods, removable bands encircling said housing and holding the sections in place, and manually operatable means for laterally shifting the sleeve to thereby project or retract the spoke.

In testimony whereof I affix my signature in presence of two witnesses.

BENJAMIN F. GILLIS. [L. S.]

Witnesses:
NICHOLAS THAUER,
ALICE VOSS.

Copies of this patent may be obtained for five cents each, by addressing the "Commissioner of Patents, Washington, D. C."